May 28, 1940. R. B. FOSTER Re. 21,463

CONTROL APPARATUS FOR RADIO RECEIVING SETS

Original Filed Aug. 28, 1933 3 Sheets-Sheet 1

Robert B. Foster Inventor

By William E. Hall

Attorney

May 28, 1940. R. B. FOSTER Re. 21,463

CONTROL APPARATUS FOR RADIO RECEIVING SETS

Original Filed Aug. 28, 1933 3 Sheets-Sheet 2

Inventor

Robert B. Foster

William E. Hall

Attorney

By

CONTROL APPARATUS FOR RADIO RECEIVING SETS

Original Filed Aug. 28, 1933 3 Sheets-Sheet 3

Inventor
Robert B. Foster
By William E. Hall
Attorney

Reissued May 28, 1940

Re. 21,463

UNITED STATES PATENT OFFICE 21,463

CONTROL APPARATUS FOR RADIO RECEIVING SETS

Robert B. Foster, Los Angeles, Calif., assignor to John B. Smiley, Los Angeles, Calif.

Original No. 2,075,809, dated April 6, 1937, Serial No. 687,217, August 28, 1933. Application for reissue February 15, 1938, Serial No. 190,640

16 Claims. (Cl. 250—20)

This invention relates to radio and television receiving apparatus, and relates more particularly to an automatic control for a radio or television receiving set.

It is a general object of the present invention to provide a simple, practical and inexpensive automatic tuning control for radio and/or television receiving sets.

It is another object of the invention to provide an automatic control for a receiving set that is operable to automatically change or adjust the receiving set to any selected tuning of innumerable broadcast stations within the range of reception of the receiving set and for any selected time of the day, and further to provide such a control whereby the receiving set may be automatically adjusted to two or more immediately adjacent and closely positioned broadcast station positions of the particular set.

It is another object of the invention to provide a control for a radio or television receiving set that is operable to automatically and accurately tune the receiving set to receive the broadcasts of any radio broadcasting station within its range of reception regardless of the location of the receiving set with respect to the broadcasting stations.

It is another object of the invention to provide an automatic control for a radio or television receiving set that is simple and easy to govern or operate.

It is another object of the invention to provide a simple and automatic control of the character mentioned that is operable to automatically change the tuning of the receiving set without causing the receiving set to make undesirable noises, and without affecting the subsequent proper and efficient operation of the set.

It is a further object of the invention to provide an automatic control of the character mentioned that may be used in connection with radio and television receiving sets of various types and characters and that does not require the alteration or modification of the principal operative parts of the receiving set.

An important object also is the provision of an apparatus, having the foregoing advantages and merits, whereby the tuning condenser, or other tuning apparatus, is automatically adjusted or turned to the desired broadcast station when a particular switch for such station is closed, and again automatically opened when the apparatus is adjusted or turned to such broadcast station.

Another object of this invention is to provide a novel, but simple, efficient, accurate and durable contact construction and arrangement for the selective tuning control switch means.

Figure 1:
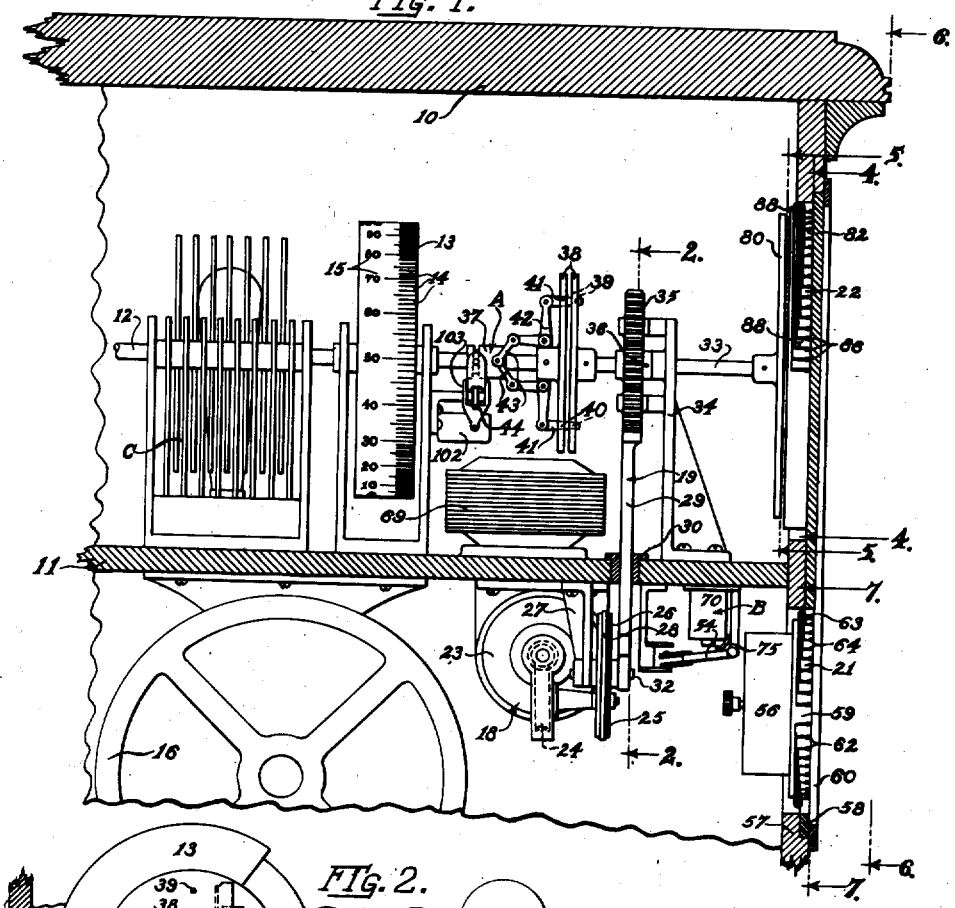
Figure 2:
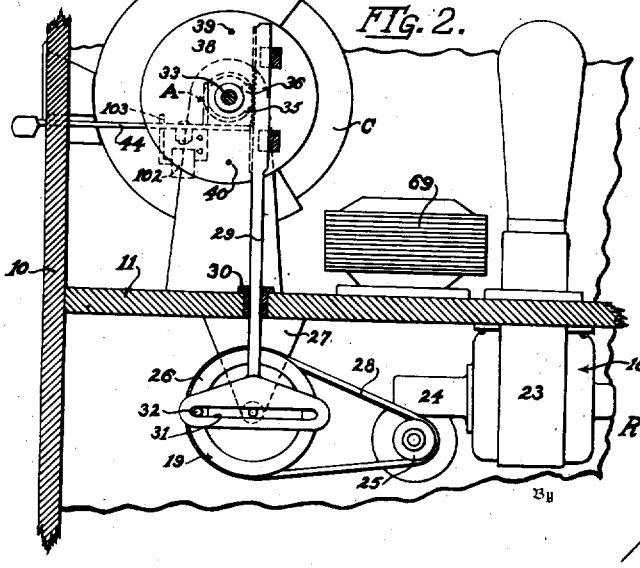
Figure 3:
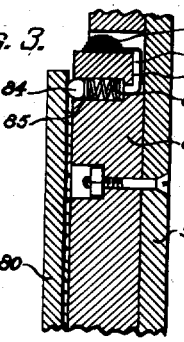
Figure 4:
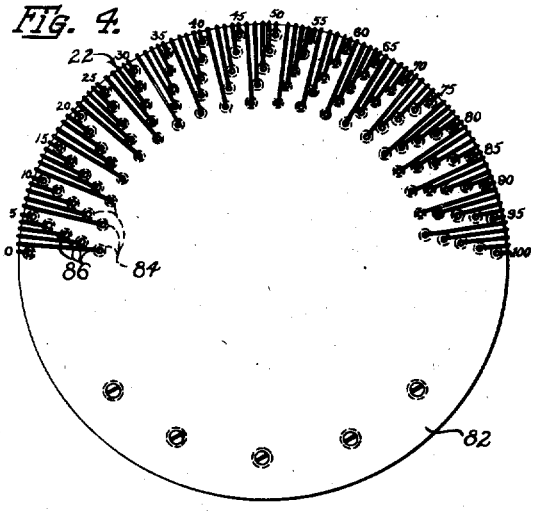
Figure 5:
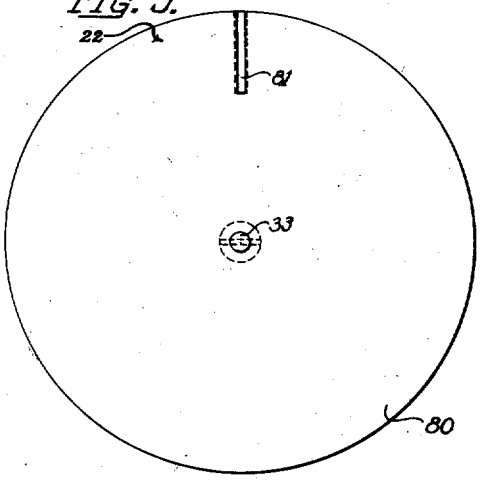
Figure 6:
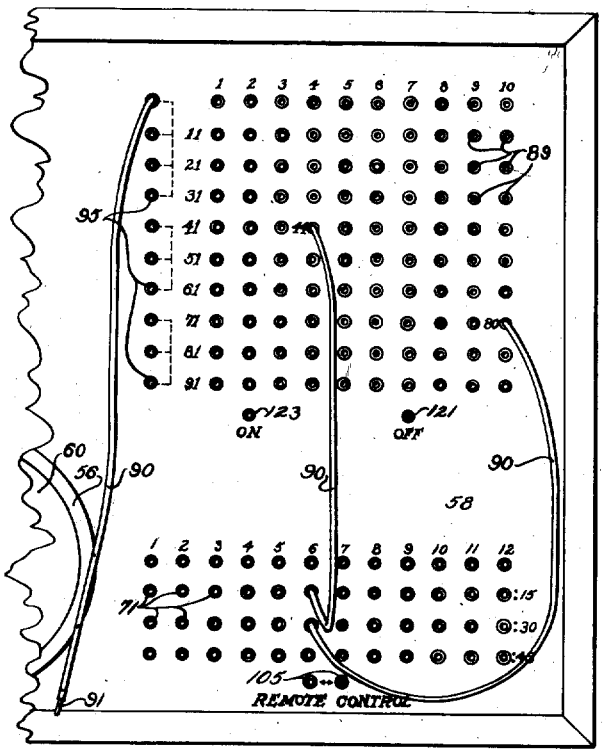
Figure 7:
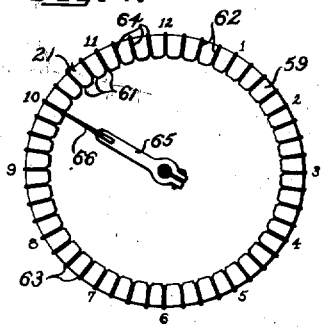
Figure 8:
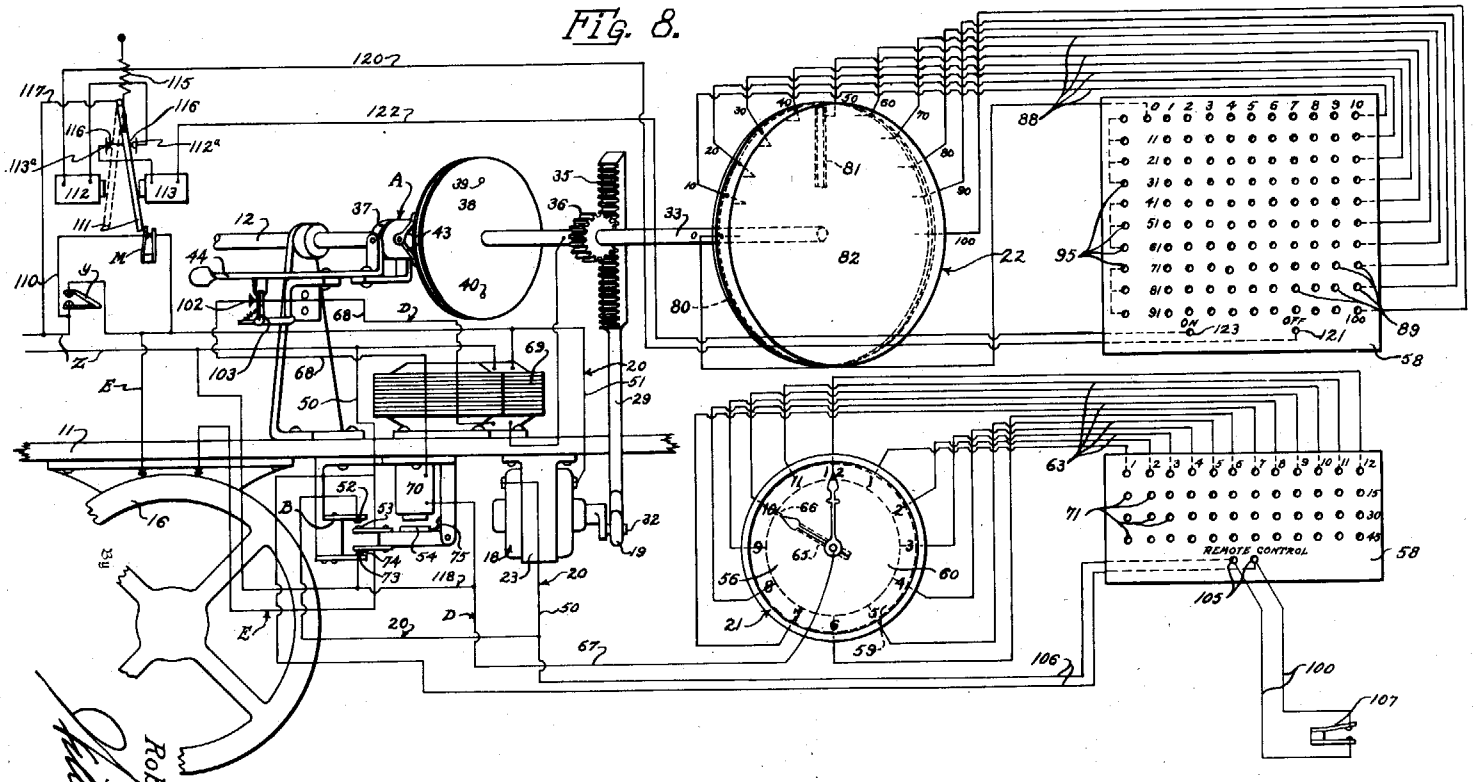

Other objects and features of the invention will be best and more fully understood from the following detailed description of a typical form and application of the invention, throughout which description reference is had to the accompanying drawings, in which:

Fig. 1 is a vertical detailed sectional view of the control provided by the present invention embodied in or used in connection with a typical radio receiving set. Fig. 2 is a transverse detailed sectional view taken substantially as indicated by line 2—2 on Fig. 1. Fig. 3 is an enlarged fragmentary detailed sectional view of the cooperating contact elements of the selective tuning control means. Fig. 4 is an enlarged side elevation of the contact plate of the selective tuning control means, being a view taken substantially as indicated by line 4—4 on Fig. 1. Fig. 5 is an enlarged front or face elevation of the disc member in the selective tuning control means, being a view taken substantially as indicated by line 5—5 on Fig. 1. Fig. 6 is an exterior elevation view of the jack panel, being a view taken as indicated by line 6—6 on Fig. 1. Fig. 7 is an enlarged vertical detailed sectional view taken substantially as indicated by line 7—7 on Fig. 1, illustrating the contact ring and wipe contact of the selective timing control means, and Fig. 8 is a diagrammatic wiring diagram of the circuits and associated parts of the control.

The automatic control provided by the invention may be embodied in the form of an attachment or appliance to be used on a previously manufactured radio or television receiving set or may be embodied in such a receiving set as initially assembled or manufactured. Throughout the following detailed description of the invention, I will describe a typical preferred form of control that may be considered as embodied in a typical radio receiving set as initially constructed. It is to be understood that the invention is not to be construed as limited or restricted to the specific form or application about to be described, but that it is to be taken as including any features or modifications that may fall within the scope of the claims.

The portion of the typical radio receiving set illustrated in the drawings, includes a case or cabinet 10 having a horizontal internal partition or shelf 11 for carrying the chassis of the receiving set mechanism and the other parts of the apparatus. The receiving set proper includes a condenser shaft 12 carrying the movable plates of one or more condensers C. A disc or dial wheel 13 is mounted on the shaft 12 and its periphery is provided with calibrations or marks 14 for indicating the setting or adjustment of the condensers C and with suitable numerals 15 at spaced marks 14. In the particular case illustrated in the drawings, the marks 14 and the numerals 15 are arbitrary indicia to indicate the various settings or adjustments of the condenser shaft 12, there being one hundred and one marks 14 designated by the numerals 15 as zero (0) to one hundred (100). It is to be noted that the control provided by the present invention may be embodied in a form for use in connection with a reciving set having a condenser shaft dial bearing marks and numerals to indicate the wave lengths of the broadcasts received or bearing other markings and calibrations. The speaker or sound reproducing unit 16 of the receiving set is attached to the under side of the shelf 11 in a suitable manner. The typical or usual manual means (not shown) for operating or controlling the condenser shaft 12 may be embodied in the apparatus and is adapted to be used to tune the set when the control of the present invention is disconnected or idle. The usual control switch Y (Fig. 8) is provided in one of the incoming leads of the energizing circuit Z of the set. The various other parts and elements of the receiving set have not been illustrated in the drawings and will not be described, as such disclosure is not essential to the complete understanding of the invention.

The automatic control provided by the invention includes generally a power means or actuating means 18, an operative drive 19 between the actuating means 18 and the condenser shaft 12, an energizing circuit 20 for the actuating means 18, and a control for the energizing circuit 20 comprising a selective time control means 21, and a selective tuning control means 22 related to the time control means 21 to cause energization of the power means 18 for any one of a plurality of different periods and at any one of a plurality of different intervals to turn the condenser shaft 12 and provide for any selected tuning of the receiving set.

The power means or actuating means 18 is provided to operate or oscillate the condenser shaft 12 of the receiving set. In the preferred form of the invention, the actuating means 18 is in the nature of a comparatively small electric motor 23. The motor 23 is illustrated as hung or attached to the under side of the shelf 11 within the cabinet 10. The motor 23 is preferably of a type in which the inertia or momentum of its moving parts does not cause "coasting" or continued rotation of the motor shaft after the energizing circuit of the motor has been broken or opened.

The operative drive 19 between the actuating means 18 and the condenser shaft 12 is operable to cause relatively slow oscillation or turning of the shaft 12 through arcs or partial rotations of substantially the same extent as that of the movable plates of the condensers C. The drive 19 includes a speed reduction gear 24 preferably in the form of a worm reduction gear mechanism operated by the shaft of the motor 23. The reduction gear 24 drives a relatively small pulley 25. A larger pulley 26 is carried by a shaft suspended from the shelf 11 by a hanger 27. A suitable belt 28 operates over the spaced pulleys 25 and 26. A vertical rod 29 slidably passes through a bearing or guide 30 in an opening of the shelf 11 and has it lower end at the pulley 26. A head or plate is provided on the lower end of the rod 29 and has a transverse slot 31. A crank pin or eccentric pin 32 is provided on the pulley 26 and operates in the slot 31. The operative connection or drive 19 includes a horizontal shaft 33 in the upper portion of the cabinet 10. The shaft 33 is supported by a suitable post or bracket 34 and is in axial alignment with the condenser shaft 12. Rack teeth 35 are provided on the upper portion of the rod 29 and cooperate with the teeth of a pinion 36 on the shaft 33. It will be apparent how rotation of the pulley 26 causes vertical reciprocation of the rod 29 and turning or oscillation of the shaft 33.

In accordance with the invention, the automatic control may be disconnected from the other parts of the receiving set when desired so that the adjustment or tuning of the set may be entirely manual. The operative drive or connection 19 between the actuating means 18 and the condenser shaft 12 includes a releasable clutch A for connecting the shafts 12 and 33. The particular clutch A illustrated in the drawings includes a sleeve 37 slidable on the forward end portion of the shaft 12. Opposing parallel plates 38 are attached to the adjacent ends of the shafts 12 and 33 and have pairs of openings 39 and 40 adapted to come into longitudinal alignment. The openings 39 are closer to the axes of rotation of the shafts 12 and 33 than the openings 40. Pins 41 are provided on pivoted bell cranks or levers 42 and are adapted to extend through the registering openings 39 and 40 to connect the shafts 12 and 33 for rotation. Links 43 operatively connect the levers 42 with the sleeve 37. A suitable manual operating member 44 projects into the cabinet 10 and has a yoked operative connection with the sleeve 37. It will be apparent how the member 44 may be operated to move the pins 41 into and out of the openings 39 and 40. As the pairs of openings 39 and 40 are at different distances from the axis of rotation, the clutch A can only be engaged when the shafts 12 and 13 are in the same respective rotative positions. When it is desired to engage the clutch A, the shaft 12 is turned by the usual manual adjusting or tuning means of the receiving set and the operating member 44 is engaged to urge the pins 41 into clutching operation. Upon the shaft 12 being turned to a particular position with respect to the shaft 33, the pins 41 are free to engage in the openings 39 and 40.

The energizing circuit 20 for the motor 23 is adapted to be connected with any suitable source of electrical energy, for example, it may be connected with a domestic electric supply or source. In the drawings, the circuit 20 is shown as including two leads 50 and 51 connected to the incoming leads of the main circuit Z of the receiving set. The circuit 20 is under the control of the selective time control means 21 as will be subsequently described, so that it is normally open, and so that it is automatically closed when the selective time control means 21 is related to the selective tuning means 22 to provide for the changing of the setting or tuning of the receiving set at a specific or selected time. A switch B is provided in the circuit 20 and is under the control of the selective timing control means and selective tuning means. The switch B may be provided in the lead 50 and may include a stationary contact 52 and a shiftable contact 53 adapted to cooperate with the contact 52. The shiftable contact 53 is connected with or carried by a pivoted armature or keeper 54 to be operated as will be subsequently described.

The control for the energizing circuit 20 of the operating means 18 is operable to close the switch B for a definite period at any selected time to cause a selected or pre-determined turning of the condenser shaft 12 and thereby bring about a selected tuning of the receiving set. In accordance with the invention, the control for the switch B includes the selective time control means 21 operable to close the switch B at any one of a plurality of definitely related time intervals throughout the day under the control of the selective tuning means 22. Means 22 may be selectively set to automatically govern the duration of a given energization of the motor 23 to result in a pre-determined or selected movement of the condenser shaft 12. It is a feature of the invention that the selective time control means 21 and the selective tuning means 22 are each independently manually adjustable or capable of selective manual setting, and are corelated to provide for the automatic tuning of the radio receiving set to receive and reproduce the broadcasting of any particular broadcasting station for any desired period of the day.

The selective timing means or selective time control means 21 includes a chronometer or clock 56. The clock 56 is preferably an electric clock involving or driven by a synchronous electric motor. The clock 56 may be attached to a side wall 57 of the cabinet 10 and is preferably positioned so that its face is set in or is visible through an opening in a panel 58 on the exterior of the cabinet side wall 57. The clock 56 has the usual face or dial 60 and hands, as shown in Fig. 8. In accordance with the invention, the time control means 21 includes a ring 59 of insulating material arranged between the face or dial 60 of the clock 56 and the body or housing of the clock. The ring 59 is concentric with the hand operating shafts of the clock 56 and is provided with a plurality of circumferentially spaced internal notches 61. The notches 61 are equally spaced and bear a definite relation to the indicia of the clock dial, for example, the notches 61 may be in the same rotative positions as the fifteen minute markings of the dial of the clock. In the particular case illustrated in the drawings, there are 48 notches 61 on the inner side of the ring 59, one notch 61 for each one-quarter hour of a day. The notches 61 preferably have outwardly converging walls. Grooves 62 radiate outwardly from the notches 61 at one side of the ring. Conductors 63 are passed or wrapped around the ring 59 and are electrically connected with posts or contacts 64 which pass through the grooves 62 to have exposed ends in the notches 61. It is to be understood that there is one conductor 63 for each contact 64.

While the ring 59 may be provided with any desired number of notches 61 and contacts 64, the broadcasts or programs of radio broadcasting stations usually are for one-quarter hour periods or multiples thereof, and therefore I have disclosed the selective time control means 21 as being operable to cause energization of the motor 23 at any of the fifteen minute periods of the day. An arm 65 is provided on the hour-hand of the clock 56 and carries a brush or wipe contact 66 for successively cooperating with the contacts 64. The contact 66 is flexible and is related to the notches 61 and contacts 64 so that it suddenly snaps into engagement with a contact upon entering a notch 61 and snaps out of engagement with the contact upon leaving the notch.

The invention includes a control circuit D, one lead 67 of which is electrically connected with the contact arm 65 and is therefore successively electrically connected with the several contacts 64 of the ring 59. The other lead 68 of the circuit D extends from a suitable transformer 69 for converting the usual alternate current to direct current. The control circuit D is operable to close the switch B in the energizing circuit 20. An electro-magnetic coil 70 is connected in the circuit D and is adapted to act upon or shift the armature 54 to close the switch B. The control circuit D is closed or completed only when the time control means 21 and the tuning control 22 are set or adjusted to provide for a change in the tuning of the receiving set at a definite time.

The automatic time control means 21 includes a multiplicity of jacks 71 arranged in openings in the panel 58. In the case where there are forty-eight contacts 64 on the ring 59, there are forty-eight jacks 71 provided in the panel 58, there being one jack 71 electrically connected with each contact 64. The conductors 63 extend from the ring 59 to the panel 58 to electrically connect the contacts 64 with the jacks 71. The jacks 71 are preferably arranged in a definite relationship or order, for example, they may be arranged in spaced rows. In the particular arrangement illustrated in the drawings, there are twelve vertical rows of jacks 71, each row having four jacks. The vertical rows of jacks 71 are headed by the numerals 1 to 12, indicating the twelve hours of the day and the lower horizontal rows of horizontally aligned jacks 71 are headed by the numerals 15, 30 and 45 to indicate the fifteen minute divisions of each of the hours. The jacks 71 are adapted to receive plugs of the shiftable or portable conductors that may be selectively connected in the tuning control means 22 as will be subsequently described, to complete the control circuit D.

It is an important feature of the invention that the control is operable to de-energize or break the energizing circuit of the sound reproducing unit or speaker 16 during the automatic adjusting or tuning of the receiving set. A stationary contact 73 is provided in the circuit E of the speaker at a point spaced from the contact 52 of the switch B. The keeper or armature 54 carries a contact 74 for cooperating with or engaging the contact 73. The contact 74 is electrically connected in the circuit E and is normally held in engagement with the contact 73 by a spring 75 holding the armature 54 in its down or unactuated position. It will be apparent that when the control circuit D is closed or completed, that the energizing circuit E of the speaker 16 is opened simultaneously with the closing of the energizing circuit 20 of the actuating means 18.

The selective tuning means or tuning control 22 may be manually adjusted or set to provide for the tuning of the receiving set to receive the broadcast from any radio broadcasting station within the range of reception of the receiving set and is related to the time control means 21 to provide for the tuning of the receiving set at any time of the day to receive any specific broadcast. The tuning control means 22 includes a disc 80 provided on the forward end of the shaft 33. The disc 80 is preferably electrically grounded to the chassis of the apparatus in a suitable manner. In accordance with the invention, the disc 80 has a smooth flat outer face in which is set or embedded a flush member 81 of insulating material. The member 81 of insulating material is radially disposed in the face of the disc 80 and extends inwardly from the periphery of the disc. A stationary disc or plate 82 is mounted on the inner side of the panel 58 in spaced parallel relation to the outer surface of the disc 81. A multiplicity of spaced openings 83 is provided in the plate 82, parallel to the axis of the plate. In the particular form of the invention being described, there is an opening 83 for each marking 14 of the dial on the condenser shaft 12. The openings 83 are circumferentially and radially spaced within a band or area of 180° extent. The band or area in which the openings 83 are provided is of approximately the same radial extent as the insulation member 81. Ball contacts 84 are provided in the outer ends of the openings 83 and are adapted to cooperate with the outer face of the disc 80. Springs 85 may be provided in the openings 83 to normally yieldingly urge the balls 84 outwardly into contact with the disc 80. Leads 86 are electrically connected with the ball contact 84 through the springs 85 and extend outwardly through radial grooves 87 to the periphery of the plate 82. Each lead 86 is electrically connected with a conductor 88. The several conductors 88 extend to and are electrically connected with jacks 89 provided in spaced openings in the panel 58. In order to simplify the disclosure in Figure 1, I have reduced the number of conductors 63 and 88, it being understood that there is one conductor 63 for each contact 64 and one conductor 88 for each contact 84.

The one hundred and one sockets or jacks 89 are preferably arranged in a definite order, for example, they may be arranged in vertical and horizontal rows in the panel 58 and the panel is provided with numerals adjacent the jacks to designate the jacks as corresponding to specific rotative settings of the condenser shaft 12, that is, to correspond to the settings of the condensers C as designated by the calibrations or marks 14 of the condenser shaft dial. It is to be understood that the jacks 89 are electrically connected with the contacts 84 in proper relation with respect to the rotative positions of the disc 80 and condenser shaft 12.

The invention includes removable or portable conductors 90 adapted to be plugged in or electrically connected with the jacks 71 and the jacks 89. There is preferably a plurality of conductors 90 provided or supplied with the control. Plugs 91 are provided on the opposite ends of the conductors 90 and are adapted to be plugged into or received by the jacks 71 and 89 to electrically connect with the conductors 63 and 88 of the respective jacks. When a conductor 90 has one of its plugs 91 in a jack 89, say the jack 89 numbered 44, and has the plug on its other end received by a jack 71, say the jack 71 designated as 6—15, the control circuit D is completed through the said conductor 90 when the contact 66 comes into engagement with the contact 64 located at the point corresponding to six-fifteen o'clock on the clock dial to cause energization of the coil 70 which closes the switch B to energize the motor 23 and simultaneously breaks the energizing circuit E of the speaker 16. The motor 23 turns or oscillates the disc 80 through the drive 19 until the contact 84 electrically connected with the said jack 89, designated as 44, is engaged by the strip 81 of insulation whereupon the control circuit D is broken causing de-energization of the motor 23 and re-energization of the speaker 16. When this occurs, the condenser shaft 12 will have been turned to a position where the mark 14, designated as 44, will be at the adjusted position, or in other words, the radio receiving set will be "tuned" to 44 on the dial. The radio receiving set of course continues in operation with the exception of the speaker 16 so that its tubes remain warm and the operation of the set, that is, the reception of the broadcasts is not affected by the automatic tuning. The receiving set will remain adjusted at any particular tuning until the control circuit D is again completed. It is to be understood that a plurality of conductors 90 may be employed to connect any desired number of jacks 89 with a corresponding number of jacks 71 to provide for the automatic adjustment or tuning of the receiving set to receive broadcasts of various different broadcasting stations at different times of the day.

A plurality of sets of inter-connected jacks 95 may be provided in the panel 58. In the particular case illustrated in the drawings, there are three sets of inter-connected jacks 95, one set comprising four jacks, and two sets comprising three jacks. When it is desired to tune in on the broadcast of a particular broadcasting station at different periods through the day, a conductor 90 may be plugged into the jack 89 corresponding to the setting or tuning of the receiving set to bring in that particular station and may be plugged into one of the inter-connected jacks 95. Other conductors 90 may then be plugged into the other jacks 95 of the same set to provide for the tuning of the receiving set to receive the broadcasts of the same station at the desired or selected times of the day.

The invention may include a remote control whereby a person at a point remote from the receiving set may cause energization of the motor 23 and thus automatically turn the condenser shaft 12 until the set is tuned as desired. The remote control may include conductors 100 adapted to be "plugged" into jacks 105 in the panel 58. The jacks 105 are connected in the energizing circuit 20 by conductors 106 which bridge the switch B. A manually controllable switch 107 is adapted to connect the conductors 100 to complete the circuit 20. It will be apparent how the switch 107 may be governed to cause the desired energization of the motor 23 and oscillation of the condenser shaft 12. The circuit 20 may be opened by means of the switch 107 upon the set being tuned as desired. As the switch B is not operated when the switch 107 is closed, the speaker remains in operation so that the operator may tune onto the desired broadcasting station without looking at the dial of the set.

A switch 102 may be provided in the control circuit D to break or open the circuit D when the control is disconnected from the condenser shaft 12. In practice the switch 102 may be operatively related to the clutch A so as to be opened when the clutch is disengaged and so as to be closed when the clutch is again engaged. I have shown the switch 102 mounted in a position so that its operating part 103 is operable by the manual operating member 44 of the clutch.

The invention includes means for automatically energizing and de-energizing the receiving set at any selected time. A switch M is provided in a conductor or line 110 connected in one of the leads of the circuit Z bridging the control switch Y. A pivoted switch arm 111 is operable to close but insulated from the switch M. Electromagnetic means are provided to operate the arm 111. Electromagnetic coils 112 and 113 are arranged at opposite sides of the arm 111. The coil 112 is operable when energized to pivot the arm 111 and permit the switch M to open, while the coil 113 is operable when energized to pivot the arm 111 in the other direction to close the switch M. An over-center or toggle spring 115 is connected with the arm 111 to retain the arm in either one of its positions after passing its center of movement. A common lead 117 extends from the arm 111 to one of the leads of the circuit Z in front of the switch Y. Contacts 116 are provided on the opposite sides of the arm. The coils 112 and 113 have leads connected with contacts 112a and 113a respectively which are adapted to be engaged by the contacts 116. A conductor 120 extends from a pole of the coil 112 to an "off" jack 121 in the panel 58. The time control means or clock 21 is connected to the other lead of the circuit Z, such as by a wire 118. Another conductor 90 is adapted to be plugged into any selected jack 71 and the jack 121 to cause momentary energization of the coil 112 at the selected time to provide for opening of the switch M and de-energization of the receiving set.

A conductor 122 extends from a pole of the coil 113 to an "on" jack 123 in the panel 58. A conductor 90 may be "plugged" into any selected jack 71 and the "on" jack 123 to cause momentary energization of the coil 113 and closing of the switch M at the selected time. As the energizing of the coils 112 and 113 is only momentary and their energizing circuits are broken upon movement of the arm 111, the means 19 is not actuated when the switch M is operated. From the above it will be apparent how the switch M may be operated at any selected time to provide for the automatic energization or de-energization of the receiving set.

In order to turn the radio set on and at the same time to a particular station, a conductor or cord 90 is plugged into the "on" jack 123 and a jack of one of the multiples 95. Another jack of the same multiple is connected to the desired time jack 71. And another jack of the same multiple is connected to a jack 89 designating the desired broadcast station.

It is believed that the operation of the control provided by the present invention will be readily understood from the foregoing detailed description.

For manual adjustment only, assuming the switch M to be open, the switch Y is closed manually, whether the discs 38 of the clutch A are disconnected or not. This permits the radio set to be tuned in with manual adjustment of the condenser. If the switch M is closed, switch Y need not be operated.

The automatic operation may be briefly described as follows:

If the clock is set to turn on the radio set at a particular time, the switch M will be closed automatically, as described above. During automatic operation, the clutch A, or the plates of the clutch are connected, causing the shaft 12 to be operatively connected with the operating motor 23. One or more conductors 90 may have their plugs 91 plugged in the jacks 89 and 71 to provide for the automatic tuning of the receiving set to receive the broadcasts of selected broadcasting stations at selected periods. Assuming that two conductors 90 are connecting jacks 71 and 89 as illustrated in Fig. 6 of the drawings, wherein one conductor 90 is electrically connecting the jack number 44 with the jack 71 numbered 6—15 and the other conductor 90 is electrically connected with the jack 89 numbered 80 and with the jack 71 numbered 6—30. When the sweep or brush contact 66 on the hour shaft of the clock 56 comes into engagement with the contact 64 located in a rotative position corresponding to the mark of six-fifteen o'clock on the dial of the clock, the control circuit is completed through the conductor 90 plugged into the jack 71 so that the switch B is closed and the energizing circuit E of the speaker 16 is broken. Closing of the switch B causes energization of the motor 23 and turning or oscillating of the shafts 12 and 33. The shafts continue to turn until the contact 84 electrically connected with the jack 89 numbered 44 is engaged by the strip of insulation 81. The control circuit D is then broken so that the motor 23 is de-energized and the speaker 16 is re-energized. The condenser shaft 12 will stop at the setting 44 so that the radio receiving set will receive the broadcasts from a broadcasting station logged as "44." The radio receiving set will remain tuned to the station until the contact 66 snaps into engagement with the contact 64 corresponding in rotative position to the marking six-thirty o'clock, whereupon the control circuit D will be completed through the conductor 90 plugged into the jack 89 numbered 80. The motor 23 is then energized to turn the shafts 12 and 33 until the insulation member 81 engages the contact 84 electrically connected with the jack 89 numbered 80. The control circuit D is then broken, allowing the switch B to open and causing the circuit E to close. The receiving set will remain tuned at the station logged as "80" until it is shut off or disconnected from its source of power, or until a conductor 90 is plugged into a jack 71 corresponding to a subsequent time of the day, and jack 121.

From the above it will be apparent how the control is operable to automatically adjust or tune the receiving set to receive the broadcasts of any broadcasting station within its range of reception at any time of day. As the speaker 16 is de-energized during the automatic tuning, the set does not make any undesirable noises; however, the receiving set remains energized during automatic tuning so that its tubes do not cool. The automatic tuning therefore does not in any way affect the subsequent operation of the apparatus. The automatic control is such that it may be disconnected from the condenser shaft 12 at any time, and when thus disconnected the control circuit D is broken so that the speaker 16 cannot possibly be rendered inoperative.

Having described only a typical form and application of my invention, I do not wish to be limited or restricted to the specific form and application herein set forth, but wish to reserve to myself any modifications or variations, that may appear to those skilled in the art or fall within the scope of the following claims.

I claim:

1. In a control apparatus of the class described, a tuning element, an electric motor for operating the same, an electric circuit for the motor, an electrically operated switch in the circuit, a selective time control switch means having spaced contacts, a selective tuning control switch means having spaced contacts corresponding with substantially all of the station positions of the tuning element, a switch board having two sets of jacks, one set being fixedly connected to the first contacts, one jack to each of the first contacts, and the other set being fixedly connected to the second contacts, one jack to each of the second contacts, all of said jacks being accessible at all times, and means for variously and selectively connecting certain of the jacks of one set with certain of the jacks of the other set, both of said switch means being thereby connected in series with the first switch for operating said motor a predetermined amount at a predetermined time.

2. In a control apparatus of the class described, a tuning element, an electric motor for operating the same, an electric circuit for the motor, a motor control switch in the circuit, a selective time control switch means having spaced contacts, a selective tuning control switch means comprising a multiplicity of stationary switches spaced to correspond to substantially all station positions of said tuning element, the latter switches having means in connection therewith and operatively connected to and movable with said tuning element and adapted to open said switches in sequence one at a time, said switches being arranged in rows positioned angularly with respect to the direction of movement of the movable means of said switches, certain of the time control switch contacts being adapted to be selectively connected to certain of the switches of the tuning control switch means, and both switch means being connected in series with said motor control switch, each of said multiplicity of switches being adapted to be opened for breaking the circuit formed by each of said latter switches with the motor switch.

3. In a control apparatus of the class described, a tuning element, an electric motor for operating the same, an electric circuit for the motor, a motor control switch in the circuit, a selective time control switch means having spaced contacts, a selective tuning control switch means comprising a pair of closely positioned plates, one being stationary and having a multiplicity of spaced contacts corresponding to station positions of said tuning element and positioned in engagement with the other plate, the latter plate being movable and operatively connected with said tuning element and having an insulating strip adapted to engage in sequence each of the contacts on the first plate, the contacts of the stationary plate being arranged in rows positioned angularly with respect to the direction of the longitudinal extent of the insulating strip, certain of the contacts on the time control switch means being adapted to be selectively connected with certain of the contacts on the first plate, and both of said switch means being connected in series with the motor switch, said insulating strip being adapted to engage one at a time the contacts on said plate for breaking the circuit formed by the latter contact with the motor switch.

4. In a control apparatus of the class described, a tuning element, an electric motor for operating the same, an electric circuit for the motor, an electrically operated switch in the circuit, a selective time control switch means having spaced contacts, corresponding to time intervals of the time control switch means, and having one jack in connection with each contact, a selective tuning control switch means so constructed and arranged as to provide a multiplicity of stationary contacts, any two or more of which may be spaced to correspond to any immediately adjacent station positions of said tuning element, a switch board having jacks thereon, each of the latter contacts being fixedly connected to only one of the latter jacks, all jacks being accessible at all times, and means for variously and selectively connecting certain of the first jacks with certain of the second jacks, both of said switch means being thereby connected in series with the first switch for operating said motor a pretedermined amount at a predetermined time.

5. In a control apparatus of the class described, a tuning element, an electric motor for operating the same, an electric circuit for the motor, a motor control switch in the circuit, selective control switches, a selective tuning control switch means so constructed and arranged as to provide a multiplicity of stationary switches spaced to correspond to substantially all station positions of said tuning element, said stationary switches having means in connection therewith and operatively connected to and movable with said tuning element and adapted to open said stationary switches in sequence one at a time, said stationary switches being arranged in rows positioned angularly with respect to the direction of movement of the movable means of said switches, said selective control switches and said multiplicity of stationary switches being connected in series with said motor control switch, and said selective control switches being adapted selectively to connect said multiplicity of stationary switches to said motor control switch, and each of said multiplicity of switches being adapted to be opened by the means in connection therewith for breaking the circuit formed by each of said latter switches with the motor control switch.

6. In a control apparatus of the class described, a tuning element, an electric motor for operating the same, an electric circuit for the motor, a motor control switch in the circuit, selective control switches, a selective tuning control switch means comprising a pair of closely positioned plates, one being stationary and having a multiplicity of spaced contacts corresponding to station positions of said tuning element and positioned in engagement with the other plate, the latter plate being movable and operatively connected with said tuning element and having an insulating strip adapted to engage in sequence each of the contacts on the first plate, the contacts of the stationary plate being arranged in rows positioned angularly with respect to the direction of the longitudinal extent of the insulating strip, said selective control switches and said switch means being connected in series with the motor control switch, and said selective control switches being adapted selectively to connect the contacts of the switch means to the motor control switch, said insulating strip being adapted to engage one at a time the contacts on said plate for breaking the circuit formed by the latter contact with the motor control switch.

7. In a control apparatus of the class described, a tuning element, an electric motor for operating the same, an electric circuit for the motor, an electrically operated switch in the circuit, selective control switches, a selective tuning control switch means so constructed and arranged as to provide a multiplicity of stationary contacts, any two or more of which may be spaced to correspond to any immediately station positions of said tuning element, a switch board having jacks thereon, each of the latter contacts being fixedly connected to only one of the latter jacks, all jacks being accessible at all times, and means for variously and selectively connecting certain of the selective control switches with certain of the jacks, said selective control switches and switch means being thereby connected in series with said electrically operated switch for operating said motor a predetermined amount.

8. In an apparatus of the class described, the combination with a current source and a radio receiver having a tuning means and a transformer for energizing the receiver through said source, of a multiple switch comprising a plurality of cooperating switches, one normally closed and the others normally open, means for shifting the switches of the multiple switch to their normal off-positions in which the first switch of the multiple switch is closed and the others are open, said means operating through one of said other switches, a second means for shifting the switches of the multiple switch to their reverse or "on" positions, the second means being connected to the current source through the first switch of the multiple switch, an on-switch for temporarily completing the circuit to the second means for reversing the switches, a magnetic switch, a motor for the tuning means, a motor circuit including said magnetic switch, and a separate circuit for controlling the magnetic switch, the latter circuit being adapted to be controlled by another of the other switches of the multiple switch when the latter is reversed, thereby closing the motor circuit.

9. In an apparatus of the class described, the combination with a current source and a radio receiver having a tuning means and a transformer for energizing the receiver through said source, of a multiple switch comprising a plurality of cooperating switches, one normally closed and the others normally open, means for shifting the switches of the multiple switch to their normal off-positions in which the first switch of the multiple switch is closed and the others are open, said means operating through one of said other switches, a second means directly connected to the current source ahead of the transformer for shifting the switches of the multiple switch to their reverse or "on" positions, the second means being connected to the current source through the first switch of the multiple switch, an on-switch for temporarily completing the circuit to the second means for reversing the switches, a magnetic switch, a motor for the tuning means, a motor circuit including said magnetic switch, and a separate circuit for controlling the magnetic switch, the latter circuit being adapted to be controlled by another of the other switches of the multiple switch when the latter is reversed and thereby closing the motor circuit, and a circuit connecting the transformer of the receiver to said source through one of said other switches of the multiple switch when the latter is reversed.

10. In a circuit of the class described, the combination with an alternating current source and a radio receiving set having a variable condenser and an alternating current transformer, of a station finder switch and motor synchronized with the condenser, a time switch, a multiple switch comprising a plurality of cooperating switches, the first normally closed and the others normally open, a magnetic switch, a motor circuit controlled by said magnetic switch, and a variable circuit connecting the current source through the first switch of said multiple switch to said time switch and thereby reversing the multiple switch and causing the current source to be connected through one of the other switches of the multiple switch to said radio receiving set and thereby causing the transformer to be connected through said time switch to the magnetic switch for operating the latter and thereby connecting the motor to said current source.

11. In an apparatus of the class described, the combination, with a current source, of a multiple switch mechanism comprising a plurality of cooperating switches, the first normally closed and the others normally open, means for shifting the switches simultaneously to their "off" positions in which the first switch of the multiple switch mechanism is closed and the others are open, said means operating through one of said other switches, and a second means for shifting the switches to their reverse or "on" positions, the current source being connected through the first switch to the second means, a radio receiver, a circuit connecting the receiver to said current source through one of said other switches, a tuning means for the receiver, a station-selecting switch synchronized with the tuning means, a motor for operating the tuning means and the station-selecting switch, an on-switch for temporarily completing the circuit to the second means for reversing the switches, a magnetically operated switch having a control magnet, a motor circuit controlled by said magnetically operated switch, and a separate circuit for controlling the magnet of the magnetically operated switch, the latter circuit being adapted to be controlled by another of the other switches of the multiple switch mechanism when the latter is reversed, thereby closing the motor circuit.

12. In an apparatus of the class described, the combination, with a current source, of a multiple switch mechanism comprising a plurality of cooperating switches, the first normally closed and the others normally open, means for shifting the switches simultaneously to their "off" positions in which the first switch of the multiple switch mechanism in closed and the others are open, said means operating through one of said other switches, and a second means for shifting the switches to their reverse or "on" positions, the current source being connected through the first switch to the second means, a radio receiver, a circuit connecting the receiver to said current source through one of said other switches, a tuning means for the receiver, a station-selecting switch synchronized with the tuning means, a motor for operating the tuning means and the station-selecting switch, a magnetically operated switch having a control magnet, a motor circuit controlled by said magnetically operated switch, the magnet of the magnetically operated switch being connected to and controlled by the station-selecting switch, a time control switch, and a variable circuit, said time control switch controlling the connection of the current source, through the variable circuit, to said second means and also to said station-selecting switch, for operating the said second means and shifting said other switches to their "on" positions, and thereby closing the magnetically operated switch for operating the motor.

13. In an apparatus of the class described, the combination, with a current source and a radio receiver having a tuning means, of a multiple switch comprising a plurality of cooperating switches, the first normally closed and another normally open, operating means for shifting the switches to their "on" positions in which the first is open and the other closed, the current source being connected through the first switch to said means, a circuit connecting the receiver to the current source through the other switch, an on-switch for temporarily completing the circuit to the operating means for shifting the switches to their "on" positions, a motor for the tuning means, a magnetically operated switch having a control magnet, a motor circuit controlled by said magnetically operated switch, and a separate circuit for controlling the magnet of the magnetically operated switch; the latter circuit being closed when the multiple switch is shifted to the "on" position, thereby closing the motor circuit.

14. In an apparatus of the class described, the combination, with a current source and a radio receiver having a tuning means, of a multiple switch comprising a plurality of cooperating switches, the first normally closed and another normally open, operating means for shifting the switches to their "on" positions in which the first is open and the other closed, the current source being connected through the first switch to said means, a circuit connecting the receiver to the current source through the other switch, a time control switch for completing the circuit to the operating means for shifting the switches to their "on" positions, a motor for the tuning means, a magnetically operated switch, a motor circuit controlled by said magnetically operated switch, and a variable circuit, said time control switch controlling the connection of the current source, through the variable circuit, to said operating means, for operating said operating means and said multiple switch, closing the magnetically operated switch, and thereby operating the motor.

15. In an apparatus of the class described, the combination, with a current source, and a radio receiver having a tuning means, of a multiple switch comprising a plurality of co-operating switches, the first normally closed and a second normally open, operating means for shifting the switches to their "on" positions in which the first is open and the second closed, the current source being connected through the first switch to said operating means, a time control switch for completing the circuit to the operating means for shifting the switches to their "on" positions, a magnetically operated switch for controlling the tuning means, said magnetically operated switch having a control magnet connected to said source through the second switch, and a variable circuit, said time control switch controlling the connection of the current source through the variable circuit to said operating means and said tuning means for operating the latter and said multiple switch, and thereby closing the magnetically operated switch and controlling the tuning means.

16. In an apparatus of the class described, the combination, with a current source and a radio receiver having a tuning means, of a time control switch, a multiple switch comprising a plurality of cooperating switches, one normally closed and the others normally open, means for shifting the switches of the multiple switch to their normal "off" positions in which the first switch of the multiple switch is closed and the others are open, said means operating through one of said other switches, a second means connected to the current source for shifting the switches of the multiple switch to their reverse or "on" positions, said time control switch being adapted temporarily to connect the second means to said source through the first switch of the multiple switch for reversing the switches to their "on" positions, a magnetically operated switch for controlling the tuning means, said magnetically operated switch having a control magnet connected to said source through another of said other switches of the multiple switch, and a variable circuit, said time control switch controlling the connection of the current source through the variable circuit to said operating means for operating the latter and said multiple switch, and thereby closing the magnetically operated switch and controlling the tuning means.

ROBERT B. FOSTER.